United States Patent [19]
Soeda

[11] 4,274,037
[45] Jun. 16, 1981

[54] MOTOR SPEED CONTROL SYSTEM

[75] Inventor: Katsuji Soeda, Sukagawa, Japan

[73] Assignee: Yamamoto Electric Industrial Co., Ltd., Sukagawa, Japan

[21] Appl. No.: 48,369

[22] Filed: Jun. 14, 1979

[30] Foreign Application Priority Data

Jun. 16, 1978 [JP] Japan .................................. 53-72962
Aug. 25, 1978 [JP] Japan ................................ 53-103634

[51] Int. Cl.³ .......................... H02P 5/16; H02P 3/08
[52] U.S. Cl. .................................... 318/331; 318/266; 318/345 CA; 318/467
[58] Field of Search ........... 318/331, 467, 266, 345 D, 318/345 H, 345 CA

[56] References Cited
U.S. PATENT DOCUMENTS

| | | | |
|---|---|---|---|
| 3,586,947 | 6/1971 | Ilk et al. ................................ | 318/331 |
| 3,875,485 | 4/1975 | Hornung ......................... | 318/345 D |
| 3,940,890 | 9/1975 | Wenrich ................................ | 318/467 |
| 4,084,119 | 4/1978 | Kato et al. ........................... | 318/341 |
| 4,170,749 | 10/1979 | Soeda .................................... | 318/331 |

Primary Examiner—David Smith, Jr.
Attorney, Agent, or Firm—Armstrong, Nikaido, Marmelstein & Kubovcik

[57] ABSTRACT

A speed control system for a motor comprises a main motor circuit for supplying the motor current to the motor from an AC power supply via a main switch, a full-wave rectifier circuit and a semiconductor element with a control electrode, variable voltage setting means connected to the full-wave rectifier circuit, charge-discharge element connected to the variable voltage setting means and impressed with a voltage set by the variable voltage setting means, and a trigger voltage supply element conducted for releasing the charges charged in the charge-discharge element to the control electrode of the semiconductor element as a trigger voltage when the charge voltage of the charge-discharge element reaches a predetermined level. The speed control system further comprises means for detecting the electromotive force of the motor and automatically variable resistance means connected to the charge-discharge element and having its resistance value automatically varied in response to the electromotive force of the motor detected by the motor electromotive force detector means. The automatically variable resistance means controls the charging current to the charge-discharge element in accordance with the resistance value thereof. The conduction phase of the semiconductor element is retarded with an increase in motor electromotive force and advanced with a decrease in motor electromotiveforce.

13 Claims, 3 Drawing Figures

MOTOR SPEED CONTROL SYSTEM

BACKGROUND OF THE INVENTION

The present invention relates to a motor speed control system or more in particular to an improvement in a motor speed control system subjected to a very small speed variation with a change in load.

In a conventional motor speed control system supplying a full-wave rectified current to the motor through a semiconductor element with a control electrode from an AC power source, an automatic variable resistance means whose resistance value changes in accordance with the terminal voltage of the motor is used to stabilize the motor speed against load variations is such a manner that the firing angle of the semiconductor element with the control electrode is controlled in accordance with the change in resistance value, thus subjecting the speed factors of the motor to feedback control. A typical example of such a motor speed control system is disclosed in U.S. patent application Ser. No. 811625 now U.S. Pat. No. 4,168,455 entitled "Motor Speed Control System" and filed June 30, 1977 by Katsuji Soeda et al and assigned to an assignee common to the present applicant.

In such a speed control system, the electromotive force of the motor is directly applied to the automatic variable resistance means, i.e., the base of a transistor. When the electromotive force of the motor undergoes a change of short cycles in accordance with the charge of short cycle of the load, therefore, the conduction state of the transistor is also subjected to a change of a short cycle similarly. This makes unstable the feedback action against the speed factors of the motor, thus reducing the stability of the motor speed. In other words, since the rotational electromotive force of the motor directly acts on the transistor, the feedback response to the change of the load is too excessive, so that the operation of the semiconductor element with a control electrode, i.e., a Triac is unstable, thus causing the unfavourable phenomenon that the Triac may conduct intermittently for each half or one cycle of the AC power source. This phenomenon is more conspicuous when the feedback action is stronger, often resulting in unstable motor revolutions to such a degree as to make the system inoperable. This phenomenon is also very conspicuous when a load varies greatly.

SUMMARY OF THE INVENTION

Accordingly, it is an object of the present invention to obviate the above-mentioned disadvantages of the conventional motor speed control systems.

Another object of the present invention is to provide a motor speed control system which is capable of feedback control with high stability against load variations.

In order to achieve the above-mentioned objects, according to one aspect of the present invention, there is provided a motor speed control system comprising: a main motor circuit for supplying a motor current to a motor from an AC power source through a main switch, a full-wave rectifier circuit and a semi-conductor element with a control electrode; a variable voltage setting means connected to the full-wave rectifier circuit; a charge-discharge element impressed with a voltage set by the variable voltage setting means connected therewith; a trigger voltage supply element connected to the charge-discharge element, said trigger voltage supply element being conducted and releasing the charges charged in the charge-discharge element to the control electrode of the semiconductor element as a trigger voltage when the charge voltage of the charge-discharge element reaches a predetermined value; means for detecting the electromotive force of the motor with a predetermined time constant; and an automatically variable resistance means connected to the charge-discharge element and having its resistance value automatically varied in response to the motor electromotive force detected by the electromotive force detector means; the automatically variable resistance means controlling the charging current to the charge-discharge element in accordance with the resistance value thereof, the conduction phase of the semiconductor element being retarded with an increase in the motor electromotive force and advanced with a decrease in the motor electromotive force.

Other objects and features of the present invention will be apparent from the following detailed description to be read in conjunction with the accompanying drawings, in which:

DETAILED DESCRIPTION OF THE PREFERRED EMBODIMENTS

Figure 1:
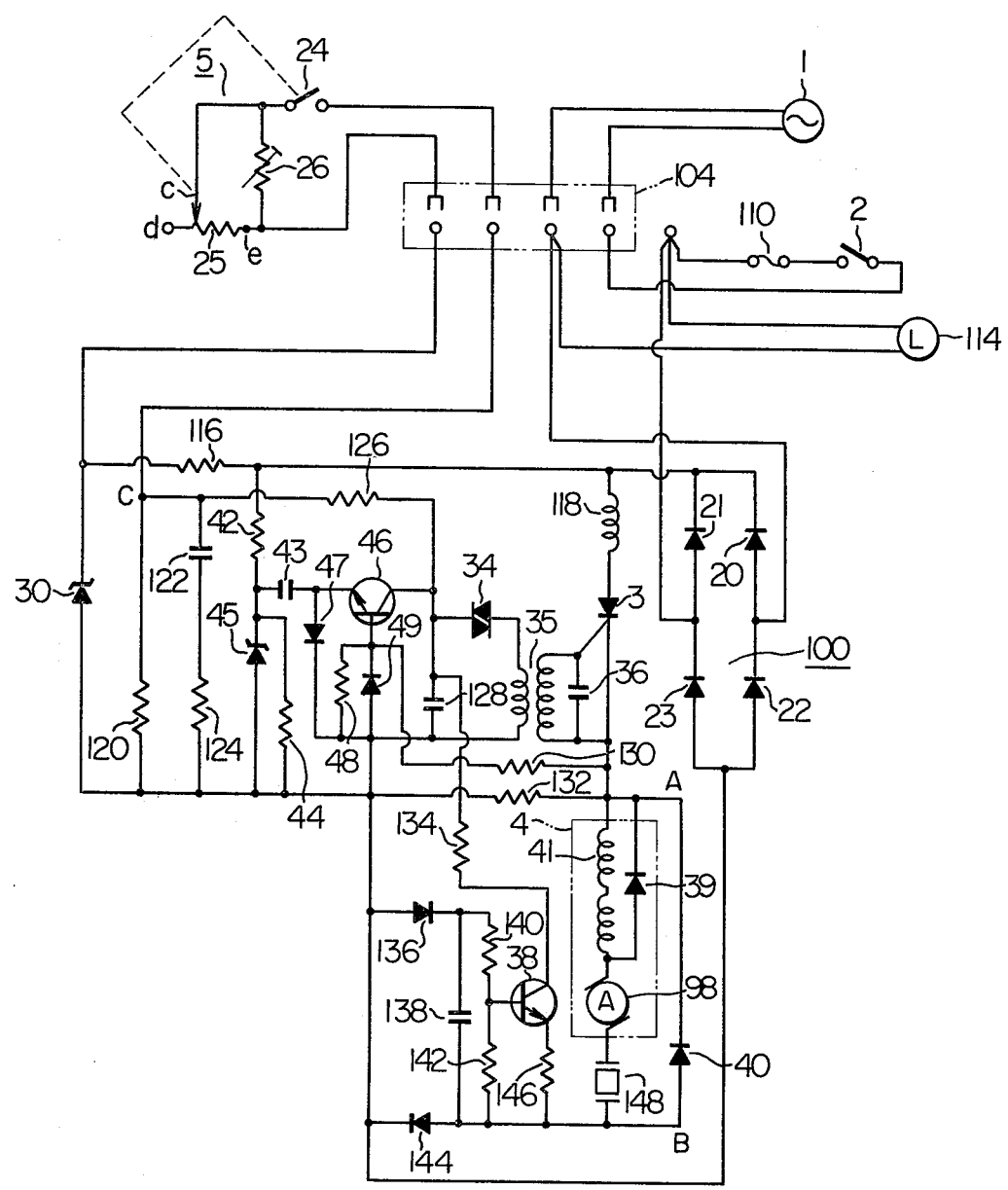
FIG. 1 is a circuit diagram showing a first embodiment of the motor speed control system according to the present invention.

In the accompanying drawings, like reference numerals denote like component elements. The diagram of FIG. 1 shows a circuit of a first embodiment of the speed control system according to the present invention.

An AC power source 1 is connected to a circuit contained in a sewing machine by a connector 104. A speed controller 5 is also connected to the circuit by the connector 104. The AC power source 1 is connected to a full-wave rectifier circuit 100 including four diodes 20, 21, 22 and 23 through the connector 104 and a power switch 2. The AC power source 1 is also connected with an indication lamp 114 for indicating the on-off state of the power switch 2.

The full-wave rectified voltage produced from the full-wave rectifier circuit 100 is applied to a constant voltage element such as a zener diode 30 through a resistor 116. The terminal voltage of the zener diode 30 is therefore trapezoidal in form. This trapezoidal wave voltage is applied to a series circuit including a resistor 120, a capacitor 122 and a resistor 124 and a series circuit including a resistor 126 and a charge-discharge element such as a capacitor 128 via the speed controller 5. A trigger voltage supplying element such as a Triac 34 and the primary winding of a pulse transformer 35 are connected in series across the capacitor 128. The variable voltage setting means i.e., the speed controller 5 includes a parallel circuit of a speed-controlling variable resistor 25, a semi-fixed resistor 26 and a switch 24 connected in series with the parallel circuit. The switch 24 is operatively interlocked with the slider C of the variable resistor 25. The switch 24 is open when the resistance value of the variable resistor 25 is maximum, i.e. when the slider C is located at terminal d, while it is closed when the slider C is moved slightly toward terminal e from the terminal d. The slider C is interlinked with a foot pedal or the like (not shown) and moves from terminal d toward terminal e when the foot pedal is pressed.

The full-wave rectified voltage produced from the full-wave rectifier circuit 100 is applied through a resistor 42 to a constant-voltage element such as a zener diode 45 where the applied voltage is transformed into a trapezoidal wave voltage. This trapezoidal wave voltage is applied across a capacitor 43 through a diode 47. The zener diode 45 is connected across a resistor 44 for forming a discharge circuit for the capacitor 43. A switching element such as a transistor 46 has its emitter connected to the junction point of the capacitor 43 and the diode 47, its base grounded via a parallel circuit including a resistor 48 and a diode 49, and its collector is connected to the junction point of the resistor 126 and the capacitor 128.

The full-wave rectified wave voltage from the full-wave rectifier circuit 100 is further applied to a series circuit including a coil 118, a semiconductor element with a control electrode such as a thyristor 3, a series DC motor 4 having a field winding 41, a fly-wheel diode 39 and an armature 98 a heat-responsive switch 148 and a diode 144. The coil 118 is for preventing the malfunction of the thyristor 3. The heat-responsive switch 148 is for protecting the motor 4 from being burned by an overload and includes a switch, connected in series with the motor, opened to cut off the motor current when the motor temperature exceeds a predetermined level. The gate of the thyristor 3 is connected to the secondary winding of the pulse transformer 35. The fly-wheel diode 39 is connected across the field coil 41 thereby to recirculate the energy held by the field coil 41 while the thyristor 3 is off. A diode 40 is inserted between the junction point A of the thyristor 3 and the field coil 41 and the junction point B of the heat-responsive switch 148 and the diode 144. This diode 40 prevents a flash voltage from being generated across the motor 98, thus preventing the malfunction of the thyristor 3. The junction point A is connected via a resistor 130 to the base of the transistor 46 on the one hand and grounded through a resistor 132 on the other hand.

An automatically variable resistance element such as a transistor 38 has its emitter connected via a negative feedback resistor 146 to the junction point B, and its collector is connected to the junction point of the capacitor 128 and the collector of the transistor 46 via a resistor 134. A capacitor 138 and a diode 136 are connected between the junction point B and the earth. The terminal voltage of the capacitor 138 is divided by resistors 140 and 142, and the resulting divided voltage is applied to the base of the transistor 38. The capacitor 138 and the resistors 140 and 142 make up a motor electromotive force detector means.

Now, the operation of the first embodiment of the present invention described above will be explained.

First, the power switch 2 is closed. In this case, assume that the switch 24 of the speed controller 5 is held off. The trapezoidal wave voltage generated across the zener diode 30 fails to be applied to the collector circuit of the transistor 46 since the switch 24 is off. The trapezoidal wave voltage generated across the zener diode 45, on the other hand, is applied through the capacitor 43 to the diode 47 and the emitter of the transistor 46. During the period when the trapezoidal wave voltage of the zener diode 45 is being increased, the capacitor 43 is charged through the forward current of the diode 47, while the charges of the capacitor 43 are held at the same level during the flat portion of the trapezoidal wave. With the start of reduction in the trapezoidal wave voltage, the charges in the capacitor 43 begin to be released. In this case, since a reverse voltage is applied to the diode 47, no current flows through the diode 47 so that the charges are released through the emitter-base circuit of the transistor 46, the diode 49 and the resistor 44. Since the switch 24 is off, the collector potential of the transistor 46 is zero and therefore the collector current does not flow. Thus the zener diode 45 so functions as to conduct the transistor 46 almost at the end of each half cycle, i.e., at the time of reduction in the trapezodial wave voltage. The conduction of the transistor 46 is effected by the zener diode 45 very smoothly without being affected by variations in the size of the capacitor 43 or the resistor 44. In this case, no voltage is applied at all to the collector circuit of the transistor 46, and therefore no pulse is generated across the secondary winding of the pulse transformer 35. Thus the thyristor 3 is kept in an off state, thus preventing the motor 4 from being started.

Next, the operation of the system under consideration with the switch 24 of the speed controller 5 closed will be explained.

The trapezoidal wave voltage produced across the zener diode 30 is divided by the resistor 120 and the parallel circuit of the resistors 25 and 26, and the voltage thus divided causes a charge current to flow to the capacitor 122 through the switch 24. The voltage across the resistor 120, i.e., the voltage at point C thus takes a waveform similar to a saw-tooth wave which increases during the ascending and flat periods of the trapezoidal waveform. This charge waveform voltage across the resistor 120 is further charged to the capacitor 128 through the resistor 126. If the charge voltage of the capacitor 128 reaches to a breakdown voltage of the Diac 34 during the increase thereof, the Diac 34 is turned on, so that the capacitor 128 is discharged through the Diac and the primary winding of the pulse transformer and so the primary winding current of the pulse transformer causes a pulse voltage to be generated in the secondary side for triggering the gate of the thyristor 3. The value of the semi-fixed resistor 26 is adjusted in such a manner that, under the condition where the variable resistor 25 has a maximum value, the charge voltage of the capacitor 128 is a little lower than the breakdown voltage of the Diac 34 and the transistor 46 is conducted by the above-descrived function of the zener diode 45 and the capacitor 43. Thus, in this case, the Diac 34 is not turned on nor the thyristor 3 is turned on, and therefore the motor 4 fails to be started. Further, the residual charges of the capacitor 128 are removed by the discharge function of the transistor 46 at the end of each half cycle, and therefore the misfire of the thyristor 3 by the function of the residual charges is prevented.

With the decrease in the value of the variable resistor 25 from the maximum value, the gradient of the charge voltage waveform appearing at point C increases, thus increasing the charging speed of the capacitor 128. It is thus possible to regulate the phase at which the Diac 34 is turned on by changing the value of the variable resistor 25. Thus, the thyristor 3 is turned on and the conduction current thereof is supplied to the armature 98 at the time of turning on of the Diac 34, while the thyristor 3 is turned off at the end of each half cycle of the AC source voltage. Thus by controlling the variable resistor 25, the firing angle of the thyristor 3 can be regulated, thus regulating the motor speed. In the case where the value of the variable resistor 25 is small, sucessive pulses are liable to be generated by the repetition of the discharge processes of the capacitor 128 in a given half cycle since a charging current to the capacitor 128 increases. Namely, after the Diac 34 is turned on and the charges of the capacitor 128 are released during a given half cycle of alternating current, the capacitor 128 is charged again during the same half cycle to the breakdown voltage of the Diac, thus turning on the Diac 34 again. This phenomenon is generated successively in a half cycle thereby generating successive pulses. Such successive pulses likely and undesirably act as an interference wave to the external circuits.

This invention is provided with a circuit for preventing generation of such successive pulses. Specifically, upon the turning on of the Diac 34, the thyristor 3 is turned on, so that the current from the positive electrode of the rectifier circuit 100 flows through the coil 118, the thyristor 3, the field coil 41, the armature 98, the heat-responsive switch 148 and the diode 144. Under this condition, a positive voltage is produced at the cathode of the thyristor, i.e., point A. This positive voltage is also applied to the base of the transistor 46, through the resistor 130, and therefore the transistor 46 is conducted. Thus, the transistor 46 is kept in a conductive state during the on state of the thyristor 3. The conduction of transistor 46 is also established by the capacitor 43 and the zener diode 45 at the end of each cycle of the full-wave rectified voltage. Once the Diac 34 is turned on in a given half cycle, therefore, the capacitor 128 is not charged before the next half cycle of the source voltage, thus positively preventing the pulse train from being generated in each half cycle. In this way, the transistor 46 discharges the residual charges of the capacitor 128 while the motor 4 is not driven, and further discharges the residual charges of the capacitor 128 and preventing the successive conductions of the Diac 34 in a half cycle while the motor 4 is driven.

When the motor 4 is being driven, the thyristor 3 is turned on and off repeatedly with a frequency twice the cycle of the source voltage. Regardless of the pulsage current from the thyristor 3, a substantially constant exciting current flows through the field winding 41 due to the action of the flywheel diode 39. Since the armature of the motor 4 is rotated continuously at a constant speed by the inertia of the armature, a substantially constant electromotive force is induced continuously across it. As a result, a voltage substantially equal to the electromotive force appears between the points A and B. During the period when the thyristor 3 is on, the voltage at point A is substantially equal to the output voltage of the full-wave rectifier circuit 100, and the potential at point B is substantially the earth potential because of the conduction of the diode 144 when the voltage at point A is at or near a peak. When the thyristor 3 is off, on the other hand, the voltage between the points A and B due to the electromotive force of the armature 98 causes a charge current to flow to the capacitor 138 through the resistor 132 and the diode 136. This charge current renders the potential at point A positive, but this positive potential is designed to be sufficiently small not to conduct the transistor 46. The terminal voltage of the capacitor 138 is thus somewhat smaller than the electromotive force of the armature 98 and follows the electromotive force with a predetermined time delay due to the time constant circuit of the capacitor 138 and the resistors 132, 140, 142. The charge voltage of the capacitor 138 is discharged gradually through the resistors 140 and 142. The base of the transistor 38 is impressed with a charge voltage of the capacitor 138 divided by the resistors 140 and 142. The electromotive force induced in the armature is proportional to the rotational speed of the armature, and therefore the charge voltage of the capacitor 138 is increased or decreased in proportion to the rotational speed of the armature. The collector current of the transistor 38 is thus increased or decreased in proportion to the rotational speed of the armature. The collector current of the transistor 38 acts to divide the charging current flowing into the capacitor 128 through the resistor 134, and therefore the charging speed of the capacitor 128 is inversely proportional to the rotational speed of the armature. When the rotational speed of the motor 4 is increased, therefore, the conduction phase of the Diac 34 is retarded and the firing angle (i.e., the conduction period) of the thyristor 3 is lessened, thus reducing the rotational speed of the motor. When the rotational speed of the motor is reduced, on the other hand, the conduction phase of the Diac 34 is advanced so that the firing angle of the thyristor 3 is increased, thus increasing the rotational speed of the motor. This feedback control makes possible a motor having a stable rotational speed against the load variations.

In order to attain this feedback control smoothly and stably, it is desirable that the variations in the voltage applied to the base of the transistor 38 is directly proportional to the collector current thereof. For this purpose, the emitter of the transistor 38 is connected in series with the resistor 146 for negative feedback. This achieves an even more stable and effective feedback control.

The pulse transformer 35 prevents the DC coupling between a pulse generator circuit including the capacitor 128 and the Diac 34, and a motor control circuit including the thyristor 3. As a result, when the thyristor 3 is turned off, the point A is completely cut off from the output voltage of the rectifier circuit, and therefore the electromotive force generated across the armature 98 is effectively taken out by the capacitor 138. Further, the circuit including the capacitor 138 and the resistors 140 and 142 for detecting the electromotive force of the motor detects the electromotive force of the motor with a time constant determined by the resistors 132, 140 and 142 and the capacitor 138 and applies the detected electromotive force to the base of the transistor 38. Therefore, the responsivity of the transistor 38 to the electromotive force of the motor is slower than when the electromotive force of the motor is directly applied to the base of the transistor 38. The result is that the response of the transistor 138 to the load variation of the motor is so slow as to attain a very stable feedback control of the speed factors, thus maintaining very stable the rotational speed against the load changes. Since the transistor 138 has a lower degree of response to the changes in the reverse electromotive force, the Diac 34 or the thyristor 3 is prevented from being intermittently triggered each half or one cycle of alternating current against the great change in the reverse electromotive force, thus making the conduction very stable.

The responsivity in the feedback control of the speed factors is properly controlled by regulating the values of the resistors 132, 140 and 142 and the capacitor 138.

It will be understood from the foregoing description that according to the present invention a motor stable in rotational speed is provided against load variations of the motor or against the variation of power frequencies. Especially in low-speed operation, a stable speed control is achieved.

Figure 2:
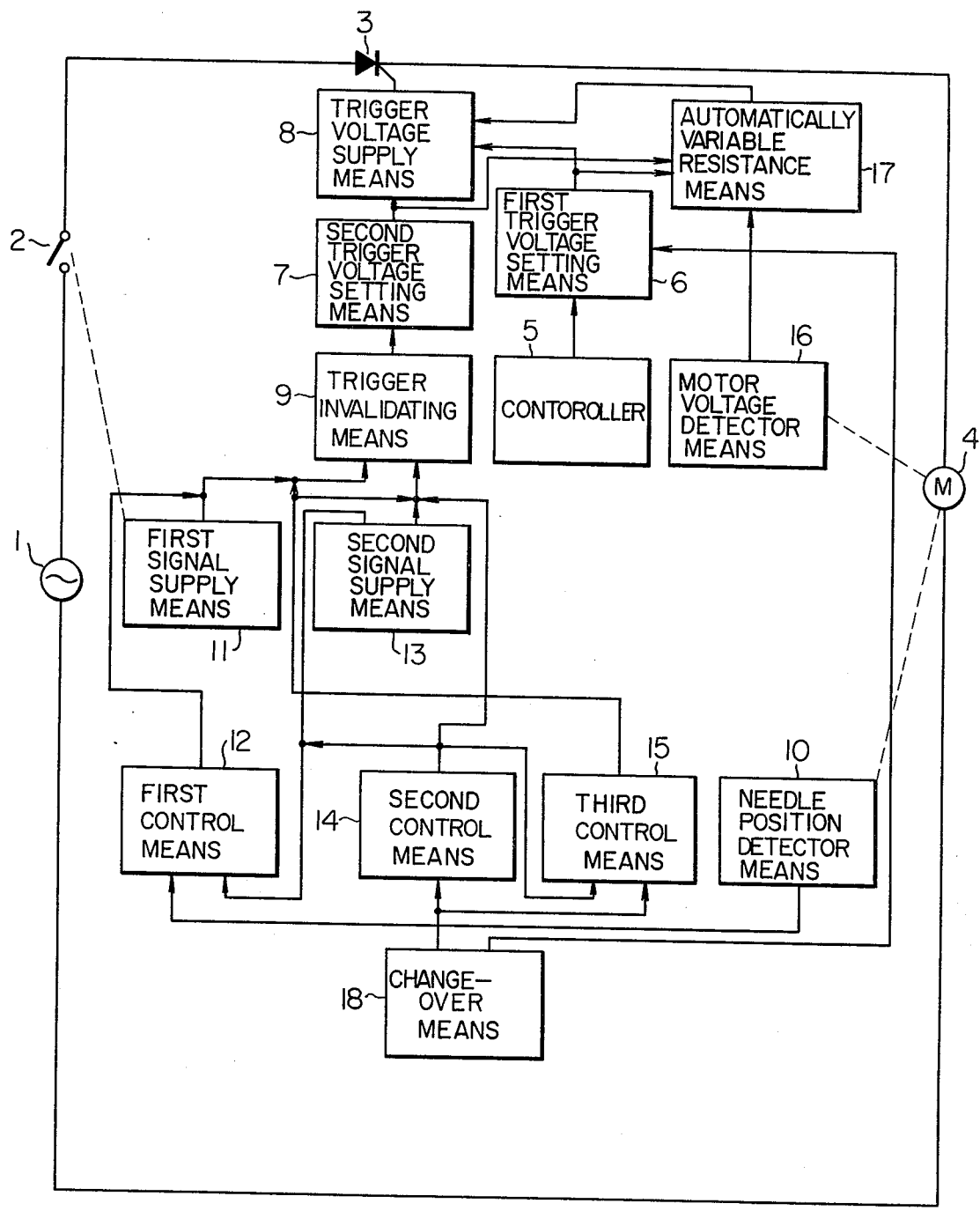
FIG. 2 is a block diagram showing a second embodiment of the motor speed control system according to the present invention.

FIG. 2 is a block diagram of a second embodiment of the speed control system of the motor according to the present invention as applied to an electric sewing machine capable of single stitch. This speed control system comprises: a main motor circuit for supplying the motor current to a motor 4 from an AC power source 1 through a main switch 2 and a semiconductor element 3 with a control electrode such as a thyristor (hereinafter reffered merely as a thyristor); a motor speed controller of foot pedal type having a variable resistor; first trigger voltage setting means 6 and second trigger voltage setting means 7 for triggering the thyristor 3 separately; trigger voltage supply means 8 for supplying the control electrode of the thyristor 3 with a trigger voltage set by the first and second trigger voltage setting means 6 or 7; trigger invalidating means 9 for invalidating the second trigger voltage setting means 7; needle position detector means 10 for detecting that the needle has reached predetermined positions; first signal supply means 11 for supplying a first signal for validating the trigger invalidating means 9 upon the turning on of the main switch 2; first control means 12 for invalidating the first signal when actuated; second signal supply means 13 for supplying a second signal for validating the trigger invalidating means and a third signal for actuating the first control means at the press of the controller; change-over means 18 adapted to be switched between first and second modes; second control means 14 being actuated upon the lapse of a predetermined time after the press of the controller 5 thereby invalidating the second and third signals thereafter; third control means 15 actuated upon the depressing of the controller thereby invalidating the first and second signals, and deactivated in response to the actuation of the second control means; means 16 for detecting the motor voltage; and automatically variable resistance means 17 having its resistance valuve varied automatically in response to the motor voltage detected by the motor voltage detector means. The voltage set by the trigger voltage setting means 6 is controlled in accordance with the resistance value of the variable resistor of the controller 5. The change-over means 18 deactivates the second and third control means in its first mode and deactivates the first trigger means in its second mode. The needle position detector means 10 deactivates the first control means upon detection of the arrival of the needle at the predetermined positions. The automatically variable resistance means controls the trigger voltage the trigger voltage supply means in accordance with the resistance value thereof.

The configuration of the embodiment under consideration will be described more in detail below with reference to FIG. 3.

Figure 3:
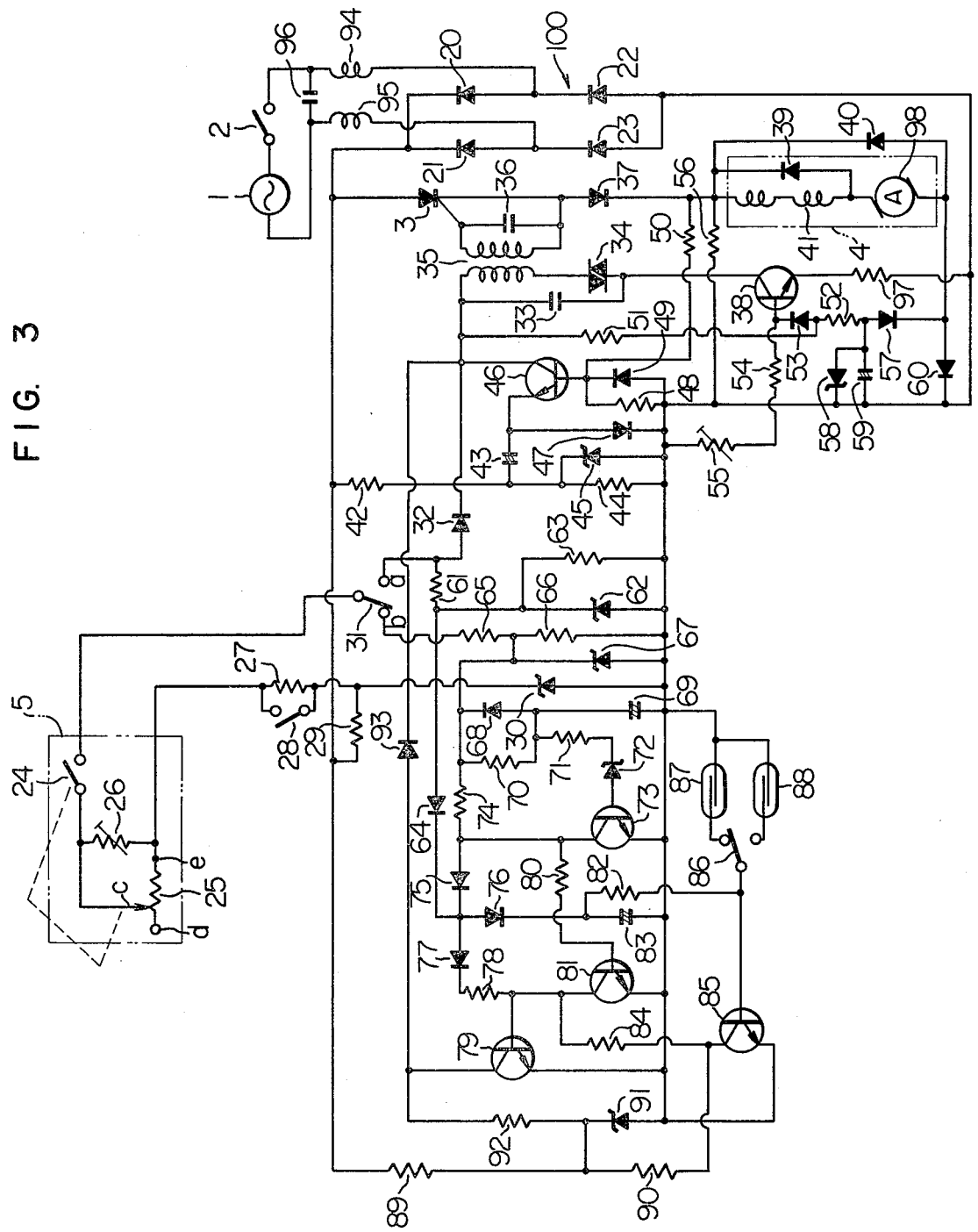
FIG. 3 is a circuit diagram of the second embodiment shown in FIG. 2.

In FIG. 3, the main motor circuit includes a full-wave rectifier circuit 100 having four silicon diodes 20, 21, 22 and 23 arranged in a bridge connection. The motor 4 is supplied with power from the power supply 1 through the mainswitch 2, the thyristor 3 and the full-wave rectifier circuit 100.

The controller 5 includes a switch 24, a variable resistor 25 and a semi-fixed resistor 26. An end of the variable resistor 25 is connected to the full-wave rectifier circuit 100 through a speed selecting switch 28 and resistors 27 and 29.

The first trigger voltage setting means 6 includes a series circuit of a zener diode 30, a diode 32, a capacitor 33 and a transistor 38. The cathode of the zener diode 30 is connected to the full-wave rectifier circuit through the resistor 29 on the one hand and to the capacitor 33 through the resistor 27, the switch 28, the controller 5, a switch 31 and the diode 32 on the other hand. The capacitor 33 acts as a charging element. The constant terminal voltage of the zener diode 30 is applied as a first trigger setting voltage to the series circuit of the diode 32, the capacitor 33 and the transistor 38 via the resistor 27 and the controller 5. The first trigger setting voltage is controlled by changing the resistance value of the variable resistor 25 of the controller 5, thus controlling the conduction state of the transistor 38 and the charging speed of the capacitor 3. The switch 28 is for switching the maxium speeds and by closing it, a higher maximum speed is selected.

The second trigger voltage setting means 7 includes a series circuit of a constant voltage element such as a zener diode 91, a resistor 92 and a diode 93 for blocking a reverse current. The zener diode 91 is connected via a resistor 89 to the full-wave rectifier circuit. The full-wave rectified voltage is converted into a trapezoidal voltage by the zener diode 91, divided by the voltage-dividing resistor 92 and applied to the capacitor 33 as a second trigger setting voltage. The value of the resistor 92 is so adjusted that the terminal voltage of the capacitor 33 is slightly higher than the breakover voltage of a bidirectional diode such as a Diac 34, thus conducting the thyristor 3 at a very small firing angle.

The trigger voltage supply means 8 includes the capacitor 33, the Diac 34 and a pulse transformer 35. The primary winding of the pulse transformer is connected in series to the Diac 34, and the second winding thereof connected to the gate of the thyristor 3.

The trigger invalidating means 9 includes a transistor 79, the emitter-collector circuit of which is connected in parallel to the series circuit of the zener diode 91 and the resistor 92. The transistor 79, when conducted, shorts the zener diode 91, thus invalidating the second trigger voltage setting means.

The needle position detector means 10 may take the form of reed switches 87 and 88, and includes a switch 86 for selecting the needle stop position. When the needle (not shown) reaches a designated point such as the top dead center, a permanent magnet (not shown) operatively interlocked with the needle approaches the reed switch 87 and closes it; while when the needle reaches the bottom dead center, the permanent magnet approaches the reed switch 88 thus closing it.

The first signal supply means 11 includes resistors 84 and 90, and upon closing of the main switch 2, applies the terminal voltage of the zener diode 91 as a first signal to the base of the transistor 79 through the voltage-dividing resistor 90 and the bias resistor 84.

The first control means 12 includes a transistor 85, the base of which is connected to the junction point of a capacitor 83 and a diode 76 via a bias resistor 82 on the one hand and connected to the switch 86 on the other hand. The collector of the transistor 85 is connected to the junction point of the resistors 84 and 90, and the emitter thereof is grounded. The capacitor 83 and the resistor 82 make up a time constant circuit. This time constant circuit is charged upon closing of the switch 24 through the switch 31, a diode 64 or 75 and the diode 76 and thus conducts the transistor 85 by its terminal voltage upon the lapse of the predetermined period after closure of the switch 24. Upon the opening of the switch 24, the charges of the capacitor 83 are discharged through the resistor 82 and the transistor 85, thus continuing the conduction of the transistor 85 for a predetermined length of time. The transistor 85, upon conduction, reduces the potential at the junction point of the resistors 84 and 90 to zero, thus invalidating the first signal.

The second signal supply means 13 includes zener diodes 62 and 67. The cathode of the zener diode 62 is connected to the controller via the terminal a of the switch 31 and a resistor 61. The cathode of the zener diode 67 is connected to the controller via the terminal b of the switch 31 and a resistor 65. When the switch 24 is closed upon depression of the controller with the switch 31 closed to terminal b side, the rectified voltage is applied to the zener diode 62, so that the terminal voltage thereof is applied via the diode 64, a diode 77 and a resistor 78 to the base of the transistor 79, thus conducting the same on the one hand and applied as a third signal to the capacitor 83 via the diode 76 on the other hand. When the switch 24 is closed with the switch 31 closed to terminal b, the rectified voltage is applied to the zener diode 67, and the terminal voltage thereof is applied as a second signal to the base of the transistor 79 through a resistor 74 and the diodes 75 and 77 and the resistor 78 on the one hand and applied as a third signal to the capacitor 83 via the diode 76 on the other hand.

The second control means 14 includes a transistor 73 and a capacitor 69. The transistor 73 has its base connected to the junction point of a resistor 70 and the capacitor 69 through a zener diode 72 and a bias resistor 71. The collector of the transistor 73 is connected to the junction point of the resistor 74 and the diode 75 on the one hand and to the base of a transistor 81 via a bias resistor 80 on the other hand. The resistor 70 and the capacitor 69 make up a timer circuit. When the switch 24 is closed with the switch 31 closed to terminal b, the rectified voltage is applied via the resistor 65 to the zener diode 67, so that the constant terminal voltage of the zener diode 67 charges the capacitor 69 through the resistor 70, so that the terminal voltage of the capacitor 69 increases at a predetermined time constant. When the terminal voltage of the capacitor 69 reaches a predetermined value, the transistor 73 conducts, thus cutting off the current, i.e., the third signal that has thus far been supplied to the capacitor 83 through the diodes 75 and 76 while at the same time cutting off the second isgnal, i.e., the current flowing through the diodes 75 and 76 and the resistor 78. The zener diode 72 is for limiting the base bias of the transistor 73 to a predetermined value.

The third control means 15 includes the transistor 81, the collector of which is connected to the base of the transistor 79, the emitter of which is grounded, and the base of which is connected to the collector of the transistor 73 through the bias resistor 80. When the switch 24 is closed with the switch 31 closed to terminal b, the terminal voltage of the zener diode 67 is applied through the resistors 74 and 80 to the base of the transistor 81, thus conducting the same, so that the base of the transistor 79 is grounded, thus invalidating the first and second signals. Thereafter, upon conduction of the transistor 73, the base of the transistor 81 is grounded, thus turning off it. Thus upon closing of the switch 24, the transistor 81 is conducted and thereafter turned off in response to the conduction of the transistor 73 a predetermined time after the closing of the switch 24.

The change-over means 18 having the switch 31 deactivates the second and third control means when the switch 31 is closed at terminal a, i.e., in the first mode, thus performing continuous stitching. When the switch 31 is closed at the terminal b, i.e., in the second mode on the other hand, the first trigger means is invalidated, thus performing the single stitch.

The motor voltage detector means 16 includes a constant voltage element such as a zener diode 58, the cathode of which is connected to a field winding 41 of the motor 4 through a resistor 56, the anode of which is connected to the base of the transistor 38 through a resistor 52 and a diode 53. When the thyristor 3 is off, the residual magnetic energy of the coil 41 is recirculated through a flywheel diode 39 and the armature crosses the magnetic field generated in the coil 41. The electromotive force thus induced in the armature (hereinafter called as the electromotive force) is applied to the parallel circuit of the zener diode 58 and a capacitor 59 via the resistor 56, while the terminal voltage of the zener diode 58 is applied as a reverse bias to the base of the transistor 38 via the resistor 52 and the diode 53. The capacitor 59 connected in parallel to the zener diode 58 is for smoothing the electromotive force of the motor. The series circuit of the capacitor 59 and the resistors 38, 52 also constructs a delay circuit which detects the electromotive force with a predetermined time constant and applies it to the base of the transistor 38.

The automatically variable resistance means 17 includes the transistor 38, the base of which is grounded via a resistor 54 and a bias-adjusting semifixed resistor 55 on one hand and connected to the cathode of the diode 32 via the diode 53 and a voltage-diving resistor 51 on the other hand. The collector of the transistor 38 is connected to the junction point of the capacitor 33 and the Diac 34, and the emitter thereof is grounded via a resistor 97. The transistor 38 is impressed with a forward bias in the form of the voltage set by the first and second trigger voltage setting means through the diode 32, the resistor 51 and the diode 53 on one hand and with a reverse bias in the form of the electromotive force detected by the zener diode 58 on the other hand.

Coils 94 and 95 and a capacitor 96 are for preventing the interference wave. The diodes 64, 75, 76 and 77 are for preventing the reverse current. A diode 68 is for quickly effecting the discharge of the charges from the capacitor 69 upon the opening of the switch 24. The resistor 74 is holding the cathode of the diode 68 at a predetermined potential upon the conduction of the transistor 73. The resistor 61 is a protective resistor for supplying a proper current to the zener diode 62.

Next, the operation of the circuit under consideration will be explained with reference to FIG. 3. First, assume that the switch 31 is closed at terminal a, thus selecting the continuous stitching mode. Also assume that the main switch 2 is closed under such a condition that the switch 24 is opened without pressing the controller 5 and a high speed operation is selected by closing the speed-selecting switch 28. The full-wave rectified source voltage is applied to the zener diode 91 through the resistor 89. The terminal voltage of the zener diode 91 is applied to the collector of the transistor 85 through the resistor 90. Since the transistor 85 is off without any base bias applied thereto, the terminal voltage of the zener diode 91 is applied via the bias resistor 84 to the base of the transistor 79, thus conducting the transistor 79. Since the transistor 79 is on, however, the terminal voltage of the zener diode 91 is not applied to the series circuit of the diode 93 and the capacitor 33, so that the capacitor 33 fails to be charged, thus keeping the thyristor 3 off. In this way, the second trigger setting voltage is invalidated by the conduction of the transistor 79.

Next, assume that the switch 24 is closed with the slider c of the variable resistor 25 moved from a terminal d toward e by pressing the controller 5 a little further. The full-wave rectified voltage is applied to the zener diode 30 via the resistor 29, so that the terminal voltage of the zener diode is applied to the resistor 52 and the diode 57 through the switch 28, the variable resistor 25, the semi-fixed resistor 26, the switch 24, the terminal a of the switch 31, the diode 32 and the resistor 51 on the one hand and to the diode 53, the resistor 54 and the semi-fixed resistor 55 on the other hand, thus biasing the base of the transistor 38, thereby to turn on the transistor 38. The resistor 55 is for properly regulating the bias. In this configuration, a charge current flows into the capacitor 33, which is charged with a time constant determined by the collector-emitter resistance of the transistor 33 and the capacity of the capacitor 33. The value of the semi-fixed resistor 26 is so adjusted that when the reistance value r between the terminal e and the slider c of the variable resistor 25 is set almost at maximum, the bias voltage of the transistor 38 is low and the charge voltage of the capacitor 33 fails to reach the breakover voltage of the Diac 34, thus preventing the thyristor 3 from being conducted.

The full-wave rectified voltage is also applied through the terminal a of the switch 31 to the zener diode 62. The trapezoidal voltage across the zener diode 62 is applied via the diodes 64 and 77 and the resistor 78 to the base of the transistor 79 on one hand (now, the transistor 79 is also biased through the resistor 84 by the closing of the main switch 2) and charges the capacitor 83 through the diodes 64 and 76 on the other hand. The charge voltage of the capacitor 83 is applied as a bias to the base of the transistor 85 via the resistor 82. This bias voltage is not applied to the base of the transistor 85, however, if the reed switch connected to the needle stop position selection switch 86 is closed. When the transistor 85 is turned on upon application of the base bias thereto, the collector potential thereof is reduced to zero, so that the bias thus far applied to the transistor 79 through the resistor 84 is cut off. The transistor 79, however, which is impressed with a bias through the resistor 78, is maintained in on state.

Now, explanation will be made of the circuit including a transistor 46 and a capacitor 43. The full-wave rectified voltage passed through the diodes 20 and 121 is divided by resistors 42 and 44 and the terminal voltage of the resistor 44 is applied to the capacitor 43 and converted into a trapezoidal wave form with a fixed maximum value by a zener diode 45. The capacitor 43 is quickly charged through a diode 47. When the terminal voltage of the zener diode 45 begins to decrease from the maximum value, the charges of the capacitor 43 are released through the resistor 44, a diode 49 and the base-emitter circuit of the transistor 46, thus turning on the transistor 46. As a result, the charges of the capacitor 33 are released completely through the collector-emitter circuit of the transistor 46 and the diode 47. In this way, the charges of the capacitor 33 are completely released each half cycle of the source voltage regardless of conduction of the Diac 34, and therefore the Diac 34 is prevented from being breaking down intermittently by the accumulated residual charges of the capacitor 33. In view of the fact that the charge voltage of the capacitor 43 is released with the decrease of the terminal voltage of the zener diode 45 from the fixed maximum value regardless of the values of capacitor 43, resistors 42 and 44, the time point when the charge voltage of the capacitor 33 reaches maximum is always advanced slightly than the time point when the charge voltage of the capacitor 43 reaches maximum. For this reason, unlike in the conventional control systems, it is not necessary to adjust the capacity of the capacitor 43 and the values of the resistors 42 and 44 but they may have some variations. Resistors 48 and 50 are for completely discharging the charge voltage of the capacitor 33 by applying a proper bias to the base of the transistor 46 and thereby turning it on.

Now, assume that the controller 5 is further pressed so that the slider c is moved toward terminal e nearer, thus reducing the resistance value r of the variable resistor 25 to a predetermined level. The base bias of the transistor 38 increases, the collector current thereof increases, and the charge voltage of the capacitor 33 increases, so that the terminal voltage of the capacitor 33 reaches the breakover voltage of the Diac 34 for the first time at or about its maximum value. The Diac 34 is thus triggered and the trigger voltage is supplied to the gate of the thyristor 3 through the pulse transformer 35. The thyristor 3 is conducted at a certain small firing angle, thus starting the motor 4 at a low speed.

When the resistance value r of the variable resistor 25 is further reduced, the base bias of the transistor 38 is further increased, so that the charge voltage of the capacitor 33 rises more sharply. The phase at which the voltage across the capacitor 33 reaches to the breakover voltage of the Diac is advanced, and so the conduction phase of the thyristor 3 is advanced, and the motor is transferred to high speed operation.

Next, operation of the system for stopping the motor will be explained. When the resistance value r of the variable resistor 25 is increased with the gradual release of the controller 5, the motor speed is reduced. When the resistance value r is maximized with the controller 5 completely released, the switch 24 opens. Upon the opening of the switch 24, the base bias that has thus far been supplied to the transistor 38 through the diode 32 is cut off, and the charging current flowing into the capacitor 33 through the diode 32 from the controller 5 is also cut off. The opening of the switch 24 also cuts off the bias current that has thus far been applied to the base of the transistor 79 through the resistor 78. At the same time, the charge voltage thus far applied to the capacitor 83 is cut off. If the reed switch 87 connected to the switch 86 is open, however, the charges of the capacitor 83 are released at a predetermined time constant through the resistor 82 and the base-emitter circuit of the transistor 85, thus keeping the transistor 85 on. In this way, the transistor 79 fails to be impressed with a base bias through the resistor 84, so that the base bias is completely cut off. The transistor 79 is thus transferred to off state. As a result, the terminal voltage of the zener diode 91 is applied as a base bias to the transistor 38 via the resistor 92 and the diode 93 and as a charging voltage to the capacitor 33. Thereafter, the Diac 34 is triggered by the charged voltage of the capacitor 33, and the thyristor 3 conducts at a very small firing angle, thus driving the motor at a very low speed without any inertia. The value of the resistor 92 is adjusted to drive the motor at a very low speed.

When the needle reaches the top dead center and the reed switch 87 closes, the charges of the capacitor 83 are released rapidly through the resistor 82 and the reed switch 87 and fail to be applied to the base of the transistor 85, thus turning off the transistor 85. The terminal voltage of the zener diode 91 is applied to the base of the transistor 79 through the resistors 90 and 84, thus turning on the transistor 79. As a result, the trigger voltage to the thyristor 3 is cut off, the motor is immediately stopped, and the needle stops at the top dead center.

The capacity of the capacitor 83 and the resistance value of the resistor 82 are so determined that the period from the time when the capacitor 83 begins to discharge to the time when it is completely discharged is at least equal to the sum of the time length required for the motor to transfer from high speed to very low speed operation by inertia upon sudden release of the controller 84 and the time length required for the needle to make one reciprocation from and to the top dead center (or bottom dead center). In the continuous stitching, therefore, the needle is always stopped at the stop position determined by the needle stop position selecting switch 86 when required.

In the above explanation, the speed selecting switch 28 is closed to apply a high bias voltage to the transistor 38. When the switch 28 is opened, on the other hand, a low bias voltage may be applied to the base of the transistor 38, thus placing the motor in a low-speed run.

The feedback circuit including the transistor 38 will be explained below. When the charge voltage of the capacitor 33 reaches a predetermined value and the Diac is triggered, thereby conducting the thyristor 3, and a full-wave rectified pulsation current flows through the motor 4. The diode 39 is a flywheel diode for circulating the magnetic energy in the field coil 41 during the cut-off state of the thyristor 3, thus increasing the electromotive force of the motor. A diode 37 is for preventing the malfunction of the thyristor 3 on the one hand and preventing the surge voltage generated by the motor from being applied to the thyristor 3 on the other hand. A diode 40 is for preventing the flash voltage from being generated by the motor, thus preventing the malfunction of the thyristor 3. The diode 53 is for preventing an excessively large voltage from being applied to the base of the transistor 38. The diode 57 is for causing the charge voltage of the capacitor 59 to effectively act on the transistor 38. The diode 60 is for passing the conduction current of the thyristor 3 while blocking the electromotive force of the motor, thus causing the zener diode 58 and the capacitor 59 to detect the electromotive force effectively.

The electromotive force proportional to the rotational speed of the motor is applied to a parallel circuit of a constant voltage element such as the zener diode 58 and the capacitor through the resistor 56. The terminal voltage of the zener diode 58 smoothed by the capacitor 59 is applied via the resistor 52 and the diode 53 to the base of the transistor 38 as a reverse bias voltage. Thus the transistor 38 is biased by a voltage equal to the difference between the forward bias voltage set by the controller 5 and applied through the resistor 51 and the electromotive force, i.e., the reverse bias voltage detected by the zener diode 58. Since the zener diode 58 is connected in parallel to the capacitor 59, the terminal voltage of the zener diode 58 increases at a predetermined time constant determined by the capacitor 59 and the resistors 38 and 52 with respect to the electromotive force. In other words, the zener diode 58 detects the electromotive force at a predetermined time delay, and the detected value is applied as a reverse bias to the transistor 38.

Assume that the motor 4 is run at fixed speed under a predetermined load. With the increase in the load, the rotational speed is decreased, and the electromotive force is proportionately decreased. Thus, the terminal voltage of the zener diode 58 decreases, the reverse bias decreases, the base bias of the transistor 38 increases, the collector current of the transistor 38 increases, the charge current to the capacitor 33 increases, and the conduction phase of the thyristor 3 is advanced, thus increasing the speed of the motor. With the decrease in the load, on the other hand, the rotational speed of the motor increases and the electromotive force increases, so that the terminal voltage of the zener diode 58 increases, thus reducing the base bias voltage of the transistor 38. As a result, the charge current to the capacitor 33 decreases, and the conduction phase of the thyristor 3 is retarded, thus decreasing the rotational speed of the motor. In this way, the base bias of the transistor 38 is controlled in accordance with load variations thereby to control the charge voltage of the capacitor 33, thus maintaining the motor speed always constant. Also, variation in the electromotive force is sensitively detected by the amplifying action of the transistor 38, thus attaining the feedback action effectively.

The resistor 97 is connected in series with the emitter of the transistor 38 to attain stable negative feedback control.

As in the first embodiment, the electromotive force is detected with a predetermined time constant and applied to the transistor 38, resulting in a low responsiveness of the transistor to the electromotive force. The transistor 38 thus responds slowly to the load variations, thus attaining the feedback control of the speed factors very stably.

Further, in the circuit according to this embodiment, the capacitor 33 is connected in series to the collector of the transistor 38 and further the base bias thereof is the difference between the electromotive force and the voltage set by the controller 5. Therefore, the phase of the charge voltage of the capacitor 33 is not retarded, thus conducting the thyristor accurately each half cycle of the source voltage, with the result that undesired intermittent triggers are eliminated for very stable control of the thyristor. Also, in view of the fact that the capacitor 33 is connected in series with the collector-emitter circuit of the transistor 38, the collector current of the transistor 38 is identical to the charge current for the capacitor 33, so that when the charge voltage of the capacitor 33 reaches the breakover voltage of the Diac 34 and the charging action stops, the collector current is alos stopped. Therefore, the control voltage applied to the other circuits undergoes only a very small change, thus attaining stable control action.

The operation for single stitch will be explained below. First, assume that the needle stop position selecting switch 86 is connected to the read switch 87 and the needle is positioned at the top dead center with the reed switch 87 closed. When the switch 31 is closed to terminal b side and the controller 5 is pressed, the full-wave rectified voltage is applied to the zener diode 67 via the resistors 65 and 66. The constant terminal voltage of the zener diode 67 charges the capacitor 69 through the resistor 70 on the one hand and biases the transistor 81 thereby turning it into on state through the resistors 74 and 80 on the other hand, while at the same time charging the capacitor 83 through the resistor 74, the diodes 75 and 76. Upon the turning on of the transistor 81, the current that has thus far been flowing through the resistors 90 and 84 or the diode 77 and the resistor 78 to the base of the transistor 79 flows to the collector-emitter circuit of the transistor 81, so that the transistor 79 is turned off and the thyristor 3 is conducted, thus driving the motor at very low speed as mentioned above. In the process, the transistor 79 is turned off regardless of the operation of the reed switch 87. In other words, the thyristor conducts when the switch 31 is closed at terminal b. With the rotation of the motor, the needle begins to move from the top dead center. When the needle leaves the top dead center, the reed switch 87 opens, and the charge voltage of the capacitor 83 is applied through the resistor 82 to the base of the transistor 85, thus turning on the transistor 85. Thus, the current that has thus far flowed through the resistors 90 and 84 to the collector of the transistor 81 flows to the collector of the transistor 85, thus keeping the transistor 79 off. When the charge voltage of the capacitor 69 increases and reaches the breakover voltage of the zener diode 72 after closing of the switch 24, thus turning on the transistor 73, the potential at the anode of the diode 75 is reduced to zero so that the transistor 81 is turned off and the charge current to the capacitor 83 is cut off. Under this condition, the reed switch 87 is already opened and the transistor 85 is turned on.

When the needle approaches again the top dead center from the bottom dead center, the reed switch 87 closes again and the transistor 85 is turned off, so that the transistor 79 is impressed with a bias through the resistors 90 and 84 thereby being turned on. Thus, the thyristor 3 is cut off, and keeping the needle at the top dead center. In this way, the single stitch is performed. It is assumed above that the values of the capacitor 69 and the resistor 70 are so determined that the transistor 73 is not turned on until the reed switch 87 is opened by the needle leaving the top dead center after the closing of the switch 24 and that the transistor 73 is turned on before the needle approaches again the top dead center and closes the reed switch 87 after one reciprocation of the needle bar. The pressing of the controller 5, i.e., the opening of the switch 24 is required to be continued at least till the transistor 73 is turned on. Once the transistor 73 is turned on, however, the controller 5 may either continue to be pressed or released immediately.

The next single stitch is accomplished by pressing the controller again after releasing the controller 5 with the needle stopped.

The charges in the capacitor 83 are released immediately through the reed switch connected to the switch 86 after the closing of the read switch. Therefore, if the reed switch is forcibly opened by manual operation of the pulley by mistake after stoppage of the needle, the base of the transistor 85 fails to be impressed with a bias and the transistor 79 is kept on, thus keeping the needle bar stop and eliminating the danger of moving the needle bar against the will of the operator.

I claim:

1. A speed control system for a motor comprising: a main motor circuit for supplying a motor current to the motor from an AC power supply through a main switch, a full-wave rectifier circuit and a semiconductor element with a control electrode; a variable voltage setting means connected to said full-wave rectifier circuit; a charge-discharge element impressed with a voltage set by said variable voltage setting means connected therewith; a trigger voltage supply element connected to said charge-discharge element, said trigger voltage supply element applying and releasing the charge in said charge-discharge element to said control electrode of said semiconductor element as a trigger voltage when the charge voltage of said charge-discharge element reaches a predetermined value; detector means for detecting the electromotive force of said motor, said detector means having a predetermined time constant; and automatically variable resistance means connected to said charge-discharge element and to said detector means, wherein the resistance value of said variable resistance means automatically varies in response to said motor electromotive force detected by said electromotive force detector means, said automatically variable resistance means controlling the charging current to said charge-discharge element in accordance with the resistance value thereof, the conduction phase of said semiconductor element being retarded with an increase in the motor electromotive force and advanced with a decrease in the electromotive force.

2. A speed control system for a motor according to claim 1, wherein said electromotive force detector means includes a parallel circuit of a resistor and a first capacitor connected in parallel to said motor, said automatically variable resistance means is a transistor, said parallel circuit being connected to base of said transistor, the collector-emitter circuit of said transistor being connected in parallel to said charge-discharge element thereby functioning as a bypass of the charge current to said charge-discharge element.

3. A speed control system for a motor according to claim 2, wherein said charge-discharge element is a second capacitor, said trigger voltage supply element being a bidirectional diode connected in parallel to said second capacitor, the emitter-collector circuit of said transistor being connected in series to a negative feedback resistor.

4. A speed control system for a motor according to claim 1, wherein said electromotive force detector means includes a parallel circuit of a constant voltage element and a first capacitor connected in parallel to said motor, said automatically variable resistance means is a transistor, said parallel circuit being connected to the base of said transistor, the collector-emitter circuit of said transistor being connected to said charge-discharge element.

5. A speed control system for a motor according to claim 4, wherein the collector-emitter circuit of said transistor being connected in series to said charge-discharge element, the base of said transistor being impressed with a forward bias in the form of the voltage set by said variable voltage setting means on the one hand and impressed with a reverse bias in the form of the electromotive force detected by said parallel circuit on the other hand.

6. A speed control system for a motor according to claim 5, wherein said charge-discharge element is a second capacitor, said trigger voltage supply element is bidirectional diode connected in parallel to said second capacitor, the emitter-collector circuit of said transistor being connected in series with a negative feedback resistor.

7. A speed control system for a motor according to claim 1, further comprising a switching element connected to said charge-discharge element and a first bias supply means connected to said full-wave rectifier circuit for applying a first bias for conducting said switching element, said first bias supply means supplying said first bias at a predetermined phase during each half cycle of the full-wave rectified current, said switching element being turned on while said first bias is being supplied thereto and releasing the charges from said charge-discharge element.

8. A speed control system for a motor according to claim 7, wherein said first bias supply means includes a parallel circuit of a constant voltage element and a first capacitor, the discharge current of said first capacitor being supplied as said first bias to said switching element.

9. A speed control system for a motor according to claim 8, wherein said switching element is a transistor, the base-emitter circuit of said transistor being connected in parallel to said parallel circuit, the discharge current of said first capacitor being supplied to the base of said transistor, the collector-emitter circuit of said transistor being connected in parallel to said charge-discharge element.

10. A speed control system for a motor acoording to claim 7, further comprising second bias supply means inserted between said semiconductor element with a control electrode and said switching element for supplying a second bias for conducting said switching element during the time when sawd semiconductor element is conducting.

11. A speed control system for a motor comprising:
a main motor circuit for supplying a motor current to said motor from an AC power supply through a semiconductor element with a control electrode;
a controller of foot pedal type with a variable resistor for controlling the speed of said motor, the resistance of said variable resistor being changed by the press of said controller;
means for setting first and second trigger voltages for triggering said semiconductor element independently;
trigger voltage supply means for applying the voltage set by said first and second trigger voltage setting means as a trigger voltage to the control electrode of said semiconductor element;
trigger invalidating means adapted to be actuated for deactivating said second trigger means;
needle position detector means for detecting that the needle of the sewing machine has reached predetermined points;
first signal supply means for supplying a first signal for deactivating said trigger invalidating means when said main switch is closed;
first control means adapted to be actuated for invalidating said first signal;
second signal supply means for supplying a second signal for actuating said trigger invalidating means and a third signal for actuating said first control means when said controller is depressed;
second control means being actuated upon the lapse of a predetermined time after the depressing of said controller thereby invalidating said second and third signals;
third control means actuated by the depressing of said controller for invalidating said first and second signals, said third control means being deactivated in response to the operation of said second control means;
change-over means for switching between first and second modes;
means for detecting the reverse electromotive force of said motor at a predetermined time constant; and
automatically variable resistance means having its resistance value varied automatically in accordance with the difference between the voltage set by selected one of said first and second trigger voltage setting means and the electromotive force of said motor detected by said motor electromotive force detector means;
the voltage set by said first trigger voltage setting means being controlled in accordance with the resistance value of said variable resistor of said controller, said change-over means deactivating said second and third control means in said first mode, said change-over means deactivating said first trigger means in said second mode, said needle position detector means deactivating said first control means upon detection that said needle has reached said predetermined points, said automatically variable resistance means controlling the trigger voltage of said trigger voltage supply means in accordance with the resistance value thereof, the conduction phase of said semiconductor element being retarded with an increase in the electromotive force of said motor and advanced with a decrease in the electromotive force of said motor.

12. A speed control system for a motor according to claim 11, wherein said reverse electromotive force detector means includes a parallel circuit of a constant voltage element and a first capacitor connected in parallel to said motor, said trigger voltage supply means including a charge-discharge element impressed with a voltage set by said first and second trigger voltage setting means and a trigger voltage supply element connected to said charge-discharge element, said trigger voltage supply element being conducted and releasing the charges from said charge-discharge element when the charge voltage of said charge-discharge element reaches a predetermined value, said released charges being supplied as a trigger voltage to the control electrode of said semiconductor element, said automatically variable resistance means being connected in series with said charge-discharge element, the resistance value of said automatically variable resistance means varied in response to a voltage representing the difference between the voltage set by selected one of said first and second trigger voltage setting means and the detected electromotive force of said motor, thereby controlling the charging speed of said charge-discharge element.

13. A speed control system for a motor according to claim 12, wherein said charge-discharge element is a second capacitor, said trigger voltage supply element being a bidirectional diode connected in parallel to said second capacitor, said automatically variable resistance means being a transistor whose collector-emitter circuit is connected in series with said second capacitor, the base of said transistor being supplied with a forward bias in the form of the voltage set by said variable voltage setting means on the one hand and impressed with a reverse bias in the form of the electromotive force of the motor detected by said parallel circuit on the other hand.

* * * * *